US010154682B2

(12) United States Patent
Ackilli et al.

(10) Patent No.: US 10,154,682 B2
(45) Date of Patent: *Dec. 18, 2018

(54) FLAVORING COMPOSITION CONCENTRATES

(71) Applicant: SOLUBLE TECHNOLOGIES GROUP, LLC, Bergenfield, NJ (US)

(72) Inventors: Joseph A. Ackilli, South Salem, NY (US); Harry H. Topalian, Weston, CT (US); Ken Hersh, Thornhill (CA)

(73) Assignee: SOLUBLE TECHNOLOGIES GROUP, LLC, Bergenfield, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/718,276

(22) Filed: Sep. 28, 2017

(65) Prior Publication Data

US 2018/0084806 A1    Mar. 29, 2018

Related U.S. Application Data

(63) Continuation of application No. 15/383,472, filed on Dec. 19, 2016, now Pat. No. 9,839,227, which is a continuation of application No. 11/403,175, filed on Apr. 12, 2006, now Pat. No. 9,560,872, which is a continuation-in-part of application No. PCT/US2006/010444, filed on Mar. 22, 2006.

(60) Provisional application No. 60/664,109, filed on Mar. 22, 2005.

(51) Int. Cl.
| | |
|---|---|
| A23L 2/68 | (2006.01) |
| A23L 2/60 | (2006.01) |
| A23L 2/39 | (2006.01) |
| A23L 2/54 | (2006.01) |
| A23L 2/56 | (2006.01) |
| A23L 27/00 | (2016.01) |
| A23L 27/29 | (2016.01) |

(52) U.S. Cl.
CPC ........ *A23L 2/60* (2013.01); *A23L 2/39* (2013.01); *A23L 2/54* (2013.01); *A23L 2/56* (2013.01); *A23L 2/68* (2013.01); *A23L 27/29* (2016.08); *A23L 27/70* (2016.08); *A23V 2002/00* (2013.01)

(58) Field of Classification Search
CPC ........................................................ A23L 2/68
See application file for complete search history.

(56) References Cited

U.S. PATENT DOCUMENTS

2002/0197376 A1* 12/2002 Broz ................. A23G 9/045
426/565

* cited by examiner

*Primary Examiner* — Jenna A Watts
(74) *Attorney, Agent, or Firm* — Polsinelli PC

(57) ABSTRACT

Rapidly dissolving flavoring composition concentrates are provided. The flavoring composition concentrates have a flavor, a solvent system, a flavor carrier system, and a densifier. The densifier is an acid modifier present in an amount such that it optimizes the rate of dispersion of the concentrate in water.

19 Claims, 1 Drawing Sheet

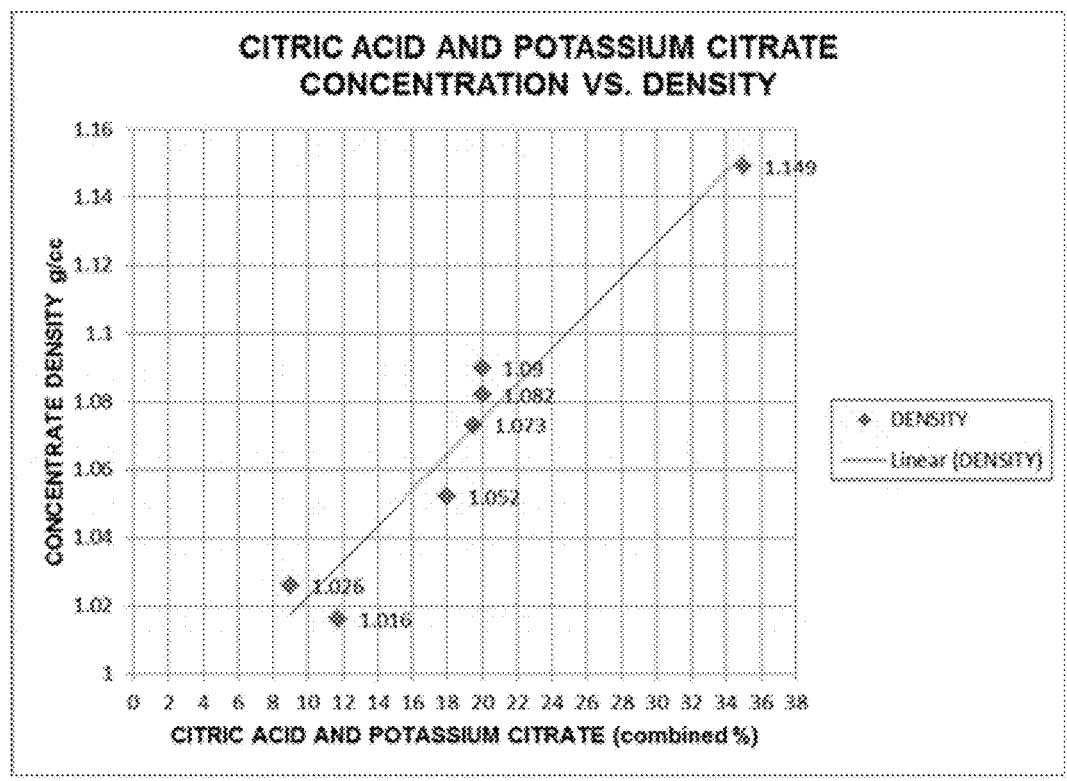

FLAVORING COMPOSITION CONCENTRATES

PRIORITY CLAIM

This application is a continuation of U.S. application Ser. No. 15/383,472, now granted as U.S. Pat. No. 9,839,227, which is a continuation of U.S. application Ser. No. 11/403,175, now granted as U.S. Pat. No. 9,560,872, which is a continuation-in-part of PCT International Application No. PCT/US06/10444, filed Mar. 22, 2006, which claims priority to U.S. Ser. No. 60/644,109, filed on Mar. 22, 2005. The contents of all aforementioned applications are incorporated herein by reference in their entirety.

BACKGROUND OF THE INVENTION

Field of the Invention

The present invention relates to flavoring concentrates. More particularly, the present invention relates to flavoring concentrate formulas that are optimized for rapid and complete dispersion in water.

Description of the Prior Art

The market for flavored beverages is a multibillion dollar industry, particularly in today's fitness conscious society. Prepared beverages are, of course, widely known.

However, portability and storage of several servings of such beverages is cumbersome. A point-of-consumption flavoring composition solves the difficulties of portability and storage. However, preparation of point-of-consumption individual servings of flavored beverages has experienced limited acceptance due to the difficulty of achieving complete dissolution in cold water.

A variety of water-insoluble solids are useful ingredients in beverages. Examples of such water-insoluble solids include, without limitation, flavor compounds, taste modifiers, nutrients and colors. While these water-insoluble solids may be dispersed in non-aqueous solvent systems to form solutions, when such solutions are added to an aqueous finished beverage, the water-insoluble solids precipitate, crystallize or oil-off due to the overall dilution of the non-aqueous solvent in which the solids were dispersed. In addition, in the absence of suitable surfactant(s), water-insoluble solids often form large crystalline pieces or waxy or oily material floating on top in beverage concentrates and syrups, respectively. All of the above-noted phase separation phenomena, aside from the obvious negative aesthetic impact, prevent the effective delivery of flavor to a given beverage. Hence, there exists a dilemma in the formulation of beverages containing such water-insoluble solids. Several approaches have been taken to address this problem.

U.S. Pat. No. 4,199,610 to Hughes et al. discloses a dry instant beverage mix. The beverage mix employs propylene glycol and ethanol to aid in rapid dispersion. The beverage mix further employs pulverization of the mix to reduce the particle size and increase the surface area, thereby improving the speed of solubility and dissolution of the mix in water.

U.S. Patent Application No. U.S. 2004/0086619 discloses the use of surfactants for improving the solubility and dispersion of solids in water based beverages. The flavoring system disclosed employs carriers and solvents including propylene glycol, ethanol, and citric acid.

However, the prior art has associated disadvantages. For example, beverages containing encapsulations or emulsions are not optically, visually, clear, i.e., water-clear. Microemulsions, while optically clear and stable, rely on large amounts of co-solvents and large amounts of surfactants; the latter are typically present in an amount that is at least five to ten times the amount of water-insoluble solids present. Such a high requirement for the amount of surfactant has potential negative impacts upon beverage quality and manufacturing efficiency. A finished beverage having such large amounts of surfactant may have off-tastes. In addition, such a beverage may not be amenable to typical beverage manufacturing processes, e.g., the dilution of concentrate to syrup to finished beverage.

Accordingly, there is a need for a method of formulating stable, clear beverages containing water-insoluble solids which does not suffer from the above-noted problems. In order to obtain a flavored beverage having a consistency which consumers regard as acceptable, it is necessary to achieve rapid dissolution of a flavoring composition in cold water.

What is not appreciated by the prior art is a flavoring composition concentrate employing a densifier for rapid dispersion in water. The present flavoring composition concentrate overcomes this deficiency in the prior art by providing a flavoring composition concentrate having at least one densifier present in an amount suitable for optimizing dispersion of the flavoring composition in water.

SUMMARY OF THE INVENTION

It is an object of the present invention to provide a concentrated flavoring composition that rapidly disperses in water.

It is another object of the present invention to provide a concentrated flavoring composition that completely disperses in water.

It is yet another object of the present invention to provide a flavoring composition concentrate having a density that is optimized to provide rapid and complete dispersion in water.

These and other objects and advantages of the present invention are achieved by the rapidly dissolving flavoring composition concentrate according to the present invention. The rapidly dissolving flavoring composition concentrate has a flavor, a solvent system, a flavor carrier system, and a densifier in any adaptive combination of the same. The densifier is an acid modifier present in an amount such that it optimizes the rate of dispersion of said concentrate in water.

BRIEF DESCRIPTION OF THE FIGURES

FIG. 1 depicts the relationship between the weight percent of the citric acid and the potassium citrate concentrations and density within the present invention.

DETAILED DESCRIPTION OF THE INVENTION

The present invention is directed to rapidly dispersing flavoring composition concentrates. The flavoring composition concentrates have a flavor, a solvent system, a flavor carrier system, and a densifier, in any adaptive combination of the same. The densifier is an acid modifier present in an amount such that it optimizes the rate of dispersion of said concentrate in water.

The flavoring composition concentrates of the present invention have a flavor for imparting a palatable flavor to water. The flavor is the composition component containing all flavors with the exception of sweetener. The flavor component of the flavoring concentrates of the present invention is a natural or artificial flavor selected from fruit flavors, botanical flavors and mixtures thereof. Fruit and other flavors can be natural or synthetically prepared flavors made to simulate flavors derived from natural sources. The flavor component can comprise a single flavor or blended flavors.

The flavors useful in the flavoring composition concentrates are sometimes available as dry ingredients, liquids or emulsions. In any of these forms, they can be dispersed into the flavoring compositions. In addition to the active flavor itself, industrially available flavors can contain, weighting agents, emulsifiers, emulsion stabilizers, antioxidants, liquid vehicles, and the like. Examples of suitable flavors for use in the flavoring composition concentrates include, for example, punch, berry, orange, lemon, lime, strawberry, kiwi, grape, peach, or any combinations thereof.

The flavor component is preferably present in the flavoring composition concentrates in an amount about 2 percentage by weight (wt. %) to about 25 wt. % of the total weight of the composition of the present invention. More preferably, the flavor component is present in an amount about 3 wt. % to about 15 wt. % of the composition.

The flavor component is preferably present in the flavoring composition concentrates in an amount about 1.0% percentage by weight (wt. %) to about 20 wt. % of the total weight of the composition of the present invention. More preferably, the flavor component is present in an amount about 1.0 wt. % to about 15% wt. % of the composition.

The flavoring composition concentrates also have a salt system. The salt system is present in an amount such that it optimizes the dispersion of the flavoring concentrate.

Suitable salts for use in the salt system include salts of sodium, potassium, calcium, and magnesium. The sodium component can be obtained from any readily available sodium salt, such as the chloride, carbonate, bicarbonate, citrate, phosphate, hydrogen phosphate, tartrate, benzoate and the like, or a combination thereof. The potassium ion component can be provided by any salt such as the chloride, bicarbonate, citrate, phosphate, hydrogen phosphate, tartrate, sorbate and the like, or a combination thereof. A chloride component can be provided by a salt such as sodium chloride or potassium chloride. A bicarbonate component can be obtained from their corresponding sodium or potassium salts, among others. A phosphate can be obtained from dissolution of hydrated disodium hydrogen phosphate and hydrated sodium dihydrogen phosphate in an aqueous solution. Magnesium can be obtained from a salt such as magnesium citrate, magnesium oxide, magnesium aspartate, magnesium chloride, or magnesium sulfate. Solubilized calcium can be supplied by calcium carbonate, calcium phosphate, calcium hydrogen phosphate, calcium dihydrogen phosphate, calcium hydroxide, calcium chloride dehydrate, calcium sulfate, as well as the respective sour salts of calcium, such as, calcium citrate, calcium malate, calcium ascorbate, or calcium orotate, and mixture thereof.

Preferably, the salt system comprises potassium citrate and sodium citrate. Potassium citrate is preferably present in an amount about 0.2 wt. % to about 1.0 wt. % of the composition. Sodium citrate is preferably present in an amount about 0.4 wt. % to about 2.0 wt. % of the composition.

The flavoring composition concentrates further have an acid. The acid is also preferably present in an amount such that it optimizes the rate of dispersion of the flavoring composition concentrates in water. Suitable acids for use in the flavoring composition concentrates include, for example, citric acid, malic acid, tartaric acid, phosphoric acid, or any suitable acid recognized in the flavoring industry, and any combinations thereof. The acid is preferably citric acid and is preferably present in an amount about 1.5 wt. % to about 10.0 wt. % of the composition.

The flavoring composition concentrates may also have a sweetener. Suitable sweeteners that can be used in the flavoring compositions and flavoring composition concentrates of the present invention include, for example, sugars including maltose, sucrose, glucose, fructose, invert sugars and mixtures thereof. These sugars can be incorporated into the flavoring composition concentrates in solid or liquid form but are typically, and preferably, incorporated as a syrup, more preferably as a concentrated syrup such as high fructose corn syrup. Carbohydrate sweeteners for use in the flavoring composition concentrates are sucrose, fructose and mixtures thereof. Fructose can be obtained or provided as liquid fructose, high fructose corn syrup, dry fructose or fructose syrup, but is preferably provided as high fructose corn syrup. High fructose corn syrup (HFCS) is commercially available as HFCS-42, HFCS-55 and HFCS-90, which comprise 42%, 55% and 90%, respectively, by weight of the sugar solids therein as fructose.

Optional artificial or noncaloric sweeteners for use in the flavoring composition concentrates include, for example, saccharin, cyclamates, sucralose, acetosulfam, acesulfame-K, L-aspartyl-L-phenylalanine lower alkyl ester sweeteners (e.g., aspartame), L-aspartyl-D-alanine amides disclosed in U.S. Pat. No. 4,411,925 to Brennan et al., L-aspartyl-D-serine amides disclosed in U.S. Pat. No. 4,399,163 to Brennan et al., L-aspartyl-L-1-hydroxymethyl-alkaneamide sweeteners disclosed in U.S. Pat. No. 4,338,346 to Brand, L-aspartyl-1-hydroxyethylakaneamide sweeteners disclosed in U.S. Pat. No. 4,423,029 to Rizzi, L-aspartyl-D-phenylglycine ester and amide sweeteners disclosed in European Patent Application 168,112 to J. M. Janusz, published Jan. 15, 1986, and the like.

While both intensive (or artificial) and nonintensive sweeteners are disclosed, a preferred embodiment of the flavoring composition concentrate has an intensive sweetener. It should also be noted that the sweetener may also incorporate both an intensive and a non-intensive sweetener.

When present, the artificial sweetener is present in the flavoring composition concentrates in an amount about 0.3 wt. % to about 2 wt. % of the total weight of the composition. Preferably, the sweetener is present in an amount about 0.5 wt. % to about 1 wt. %.

The sweetener is present in the flavoring composition concentrates in an amount about 35 wt. % to about 65 wt. % of the total weight of the composition. Preferably, the sweetener is sugar and is present in an amount about 40 wt. % to about 55 wt. %.

The flavoring composition also has a solvent or solvent system. Suitable solvents may include, for example, one or more solvents selected from the group consisting of water, alcohol, ethanol, and any combinations thereof.

The solvent or solvent system is present in the flavoring composition concentrates in an amount about 20 wt. % to about 95 wt. % of the total weight of the compositions of the present invention. In a preferred embodiment, the solvent is present in an amount about 35 wt. % to about 95 wt. %.

The solvent or solvent system is present in the flavoring composition concentrates in an amount about 5 wt. % to about 30 wt. % of the total weight of the compositions of the present invention. In a preferred embodiment, the solvent is present in an amount about 5 wt. % to about 15 wt. %.

The flavoring composition concentrates also have a flavor carrier system. The flavor carrier system functions as a carrier for the flavor additives, thereby assisting in the dispersion of the resultant flavor concentrate. Suitable flavor carriers for use in the flavoring composition include, for example, propylene glycol, ethyl alcohol, triacetin, benzyl alcohol, ethanol, glycerol and any combinations thereof. The flavor carrier preferably is propylene glycol and ethyl alcohol. Propylene glycol is preferably present in an amount about 1 wt. % to about 55 wt. % of the composition. Ethyl alcohol is preferably present in an amount about 10 wt. % to about 60 wt. % of the composition.

The flavoring composition concentrates further have a densifier. The densifier is preferably an acid modifier present in an amount such that it optimizes the rate of dispersion of the flavoring composition concentrates in water. Suitable acid modifiers for use in the flavoring composition concentrates include, for example, citric acid, malic acid, tartaric acid, phosphoric acid, or any suitable acid recognized in the flavoring industry, and any combinations thereof.

In a preferred embodiment, the densifier is an acid modifier used in combination with potassium citrate. In a more preferred embodiment, the densifier is citric acid and potassium citrate. Citric acid is preferably present in the flavoring composition in an amount about 5 wt. % to about 20 wt. % of the total weight of the composition. Potassium citrate is preferably present in the flavoring composition in an amount about 2 wt. % to about 5 wt. % of the total weight of the composition.

The relationship of citric acid and potassium citrate concentrate to the density of the flavoring composition concentrates was measured by dispersion testing. Concentrated formulas were prepared with 0.04 grams of red 40 dye (employed as an indicator for the dispersion test). 500 ml of tap water at 63 degrees F. was added to a 500 ml graduated cylinder. 5.1 grams of colored concentrate was added to the surface of the water. The time required to achieve complete dispersion of the colored concentrate was recorded. The test was conducted for six flavored concentrates. A 0.04 wt. % red 40 solution in water alone was also tested. The results are shown in Table 1A.

TABLE 1A

Citric Acid and Potassium Citrate Concentration vs. Density

| | KIWI STRAWBERRY | PEACH | LEMON | BERRY | ORANGE | GRAPE | LEMON |
|---|---|---|---|---|---|---|---|
| CITRIC ACID & POTASSIUM CITRATE CONCENTRATION (%) | 20 | 9 | 18 | 20 | 11.7 | 19.5 | 35 |
| DENSITY | 1.082 | 1.026 | 1.052 | 1.09 | 1.016 | 1.073 | 1.149 |

The experiment illustrates the relationship between the rate of dispersion of the flavoring composition concentrates as it relates to the density of the flavoring composition concentrates. The density of the flavoring composition concentrates is dependent on citric acid and potassium citrate concentrations. Specifically, as the weight percent of the citric acid and potassium citrate concentrations increases, the flavoring composition concentrates density increases. The relationship between the weight percent of the citric acid and potassium citrate concentrations and density is nearly linear, as illustrated in FIG. 1.

Increased density of the flavoring composition concentrates provides reduced dispersion time. Table 2A illustrates the time required for complete dispersion of the flavoring composition concentrates in relation to the density of the flavoring composition concentrates.

TABLE 2A

Concentrate Dispersion Time vs. Concentrate Density

| | KIWI STRAWBERRY | PEACH | LEMON | BERRY | ORANGE | GRAPE | LEMON TEST (inc. citric) | WATER |
|---|---|---|---|---|---|---|---|---|
| TIME (sec) | 8 | 12 | 11 | 9 | 20 | 13 | 9 | 100 |
| DENSITY gms/cc | 1.082 | 1.026 | 1.052 | 1.09 | 1.016 | 1.073 | 1.149 | 1 |

The flavoring composition concentrates may optionally include one or more additional functional components such as flavor enhancers, food-approved colors, vitamins, minerals, flow agents, etc. Typical colorants are any of those suitable for achieving the desired color. Included as representative are FD&C colors, and the like. Additional suitable components for the flavoring composition concentrates include, for example, an oxygen releasing agent, herbal supplements, preservatives, magnesium, calcium, potassium and sodium citrate salts or any combinations thereof.

In an alternate embodiment, the flavoring composition concentrates may have an oxygen releasing agent such as, by way of non-limiting example, carbon dioxide. When present, the oxygen releasing agent is present in an amount about 1 wt. % to about 10 wt. %, and preferably about 1 wt. % to about 5 wt. %, of the total weight of the composition.

The flavoring composition concentrate of the present invention is preferably dispensable as a gel or liquid concentrate. It should be noted that, while not preferred, the flavoring composition concentrate of the present invention may also be dispensed as a powder, foam, aerosol or granular composition.

In another embodiment, the flavoring composition concentrate may be dispensed in frozen form, such as a frozen or ice cube. In this embodiment, the frozen cube of flavoring composition is added to water and imparts flavor as it melts and disperses.

The relationship between the density of the flavoring concentrates as it relates to the rate of mixing the flavoring concentrate with water was studied. The results are illustrated in the following Tables.

TABLE 1

Lemon/Lime Flavoring Composition Ease of Mixing Study

|  | Sample 1 gms | Sample 2 gms | Sample 3 gms |
|---|---|---|---|
| Citric Acid | 1.83 | 1.83 | — |
| Potassium Citrate | 0.25 | 0.25 | — |
| Sodium Citrate | 0.61 | 0.61 | — |
| Salt | 0.43 | 0.43 | — |
| Sugar | 34.34 | — | — |
| Water | 33.60 | 67.84 | 72.26 |
| Red 40 Solution | 1.0 | 1.0 | 1.0 |
| Lemon/Lime Flavor | 1.3 | 1.3 | — |
| TOTAL | 73.36 | 73.26 | 73.26 |

Samples 1, 2 and 3 were each added to 500 ml water in a 500 ml graduate. The water temperature was maintained 60 degrees F. The time to achieve complete uniformity of mix without stirring was recorded. The results are illustrated in Table 2.

TABLE 2

Concentrate Dispersion Time vs. Concentrate Density

|  | Sample 1 | Sample 2 | Sample 2 |
|---|---|---|---|
| Time (seconds) | 3 | 12 | 130 |
| Density | 1.2410 | 1.0211 | 1.0000 |

Table 2 illustrates the time required for complete dispersion of the flavoring composition concentrates in relation to the density of the flavoring composition concentrates in linear form.

The same results were obtained when lemon lime flavor was replaced by berry flavor and punch flavor, as shown below. The results clearly show a relationship between density and rate of mixing. Specifically, the results show that a flavoring composition having a high density of about 1.2410 mixes easily with water. Flavoring compositions having lower density causes the sugar to precipitate from the composition, thereby increasing the time required for mixing.

TABLE 3

Berry Flavoring Composition Ease of Mixing Study

|  | Sample 1 gms | Sample 2 gms | Sample 3 gms |
|---|---|---|---|
| Citric Acid | 1.83 | 1.83 | — |
| Potassium Citrate | 0.25 | 0.25 | — |

TABLE 3-continued

Berry Flavoring Composition Ease of Mixing Study

|  | Sample 1 gms | Sample 2 gms | Sample 3 gms |
|---|---|---|---|
| Sodium Citrate | 0.61 | 0.61 | — |
| Salt | 0.43 | 0.43 | — |
| Sugar | 34.34 | — | — |
| Water | 33.60 | 67.84 | 72.26 |
| Red 40 Solution | 1.0 | 1.0 | 1.0 |
| Berry Flavor Givaudan 522474 | 1.4 | 1.4 | — |
| Berry Flavor FSI 439219 | 0.14 | 0.14 | — |
| TOTAL | 73.60 | 73.50 | 73.26 |

Samples 1, 2 and 3 were each added to 500 ml water in a 500 ml graduate. The water temperature was maintained 60 degrees F. The time to achieve complete uniformity of mix without stirring was recorded. The results are illustrated in Table 4.

TABLE 4

Concentrate Dispersion Time vs. Concentrate Density

|  | Sample 1 | Sample 2 | Sample 2 |
|---|---|---|---|
| Time (seconds) | 2-3 | 12 | 125 |
| Density | 1.2410 | 1.0211 | 1.0000 |

Table 4 illustrates the time required for complete dispersion of the flavoring composition concentrates in relation to the density of the flavoring composition concentrates in linear form.

TABLE 5

Punch Flavoring Composition Ease of Mixing Study

|  | Sample 1 gms | Sample 2 gms | Sample 3 gms |
|---|---|---|---|
| Citric Acid | 1.83 | 1.83 | — |
| Potassium Citrate | 0.25 | 0.25 | — |
| Sodium Citrate | 0.61 | 0.61 | — |
| Salt | 0.43 | 0.43 | — |
| Sugar | 34.34 | — | — |
| Water | 33.60 | 67.84 | 72.26 |
| Red 40 Solution | 1.0 | 1.0 | 1.0 |
| Punch Flavor FSI 445429 | 1.3 | 1.3 | — |
| TOTAL | 73.36 | 73.26 | 73.26 |

Samples 1, 2 and 3 were each added to 500 ml water in a 500 ml graduate. The water temperature was maintained 60 degrees F. The time to achieve complete uniformity of mix without stirring was recorded. The results are illustrated in Table 6.

TABLE 6

Concentrate Dispersion Time vs. Concentrate Density

|  | Sample 1 | Sample 2 | Sample 2 |
|---|---|---|---|
| Time (seconds) | 3 | 12 | 130 |
| Density | 1.2410 | 1.0211 | 1.0000 |

Table 6 illustrates the time required for complete dispersion of the flavoring composition concentrates in relation to the density of the flavoring composition concentrates in linear form.

The following examples serve to illustrate or highlight various embodiments of the invention and are not intended to limit the invention in any way. Example 1 represents the flavors to be used with the flavoring composition concentrates according to the present invention, as well as a preferred percentage for each ingredient listed.

Example 1

| INGREDIENT | 121505-1BFSS | | 121505-1LLSS | | 121505-PFSS | |
|---|---|---|---|---|---|---|
| | PERCENT | GMS/PACKET | PERCENT | GMS/PACKET | PERCENT | GMS/PACKET |
| SUGAR | 46.280 | 34.340 | 46.280 | 34.340 | 46.280 | 34.340 |
| CITRIC ACID | 2.466 | 1.830 | 2.466 | 1.830 | 2.466 | 1.830 |
| POTASSIUM | 0.337 | 0.250 | 0.337 | 0..250 | 0.337 | 0.250 |
| SODIUM | 0.822 | 0.610 | 0.822 | 0.610 | 0.822 | 0.6100 |
| SALT | 0.580 | 0.430 | 0.580 | 0.430 | 0.580 | 0.430 |
| WATER | 47.439 | 35.2 | 47.493 | 35.240 | 47.763 | 35.440 |
| BERRY FLAVOR | 1.887 | 1.400 | | | | |
| BERRY FLAVOR | 0.189 | 0.140 | | | | |
| PUNCH FLAVOR | | | | | 1.752 | 1.300 |
| LEMON LIME FLAVOR GIV 667578 | | | 2.022 | 1.500 | | |
| TOTAL | 100.000 | 74.200 | 100.000 | 74.200 | 100.000 | 74.200 |

By way of non-limiting example, any combination of the above flavors may be employed in the flavor composition concentrates. The above flavors may be manufactured in any manner known to those skilled in the art. Typically the flavors are formulated by first adding citric acid, if present, to DI water at 70° F. The mixture is mixed for fifteen minutes. The solvent(s), ethyl alcohol and propylene glycol are added. The flavor is then added. The final mixture is mixed for about fifteen minutes.

The above compositions of Example 1 are formulated by first heating DI water to about 75° F., plus or minus 5° F. The acids and intensive sweetener(s) are added simultaneously in a dry powdered form. The mixture is mixed for fifteen minutes. Temperature is maintained at 75° F., plus or minus 5° F. A liquid flavor is added. The mixture is mixed for five minutes. The mixture is heated to between about 185° F. and 215° F. The flavoring composition concentrate is packaged hot (above 180° F.) to maintain biological integrity. The packaged flavoring composition concentrate is then cooled to less than 100° F.

A standard batch of flavoring composition concentrate generates approximately 1000 pounds of liquid concentrate.

In a preferred embodiment of the present invention, about 40 to about 55% of the flavoring composition concentrate is water; about 1.5 to about 10% of the flavoring composition concentrate is acid, and about 40 to about 55% of the flavoring composition concentrate is sweetener. The flavoring composition concentrate preferably has a viscosity of about 500 to about 1500 centipoise.

The flavoring composition concentrates may be dispensed in small single serving packages pre-measured for use with a standard 12 or 16-ounce water bottle. The package may be fanciful in shape, such as bottle-shaped. The single serving packages may be available at water coolers in movie theatres or other public areas.

Example 1A represents the flavors to be used with the flavoring composition concentrates according to the present invention, as well as a preferred percentage for each ingredient listed.

Example 1A

| | Flavor | | | | | | | |
|---|---|---|---|---|---|---|---|---|
| | Berry 522474 | Lemon 881937 | Orange 480261 | Peach 480261 | Kiwi Strawberry 439220 | Strawberry 438794 | Grape 427490 | Berry 439219 |
| Propylene Glycol (%) | 53 | 0 | 25 | 48 | 35 | 0 | 0 | 25 |
| Ethyl Alcohol (%) | 10 | 60 | 25 | 48 | 28 | 52 | 39 | 23 |
| Water (%) | 30 | 25 | 45 | 0 | 30 | 40 | 46 | 45 |
| Flavor (%) | 3 | 15 | 5 | 4 | 6 | 8 | 15 | 7 |
| Citric acid (%) | 4 | 0 | 0 | 0 | 0 | 0 | 0 | 0 |

By way of non-limiting example, any combination of the above flavors may be employed in the flavor composition concentrates. The above flavors may be manufactured in any manner known to those skilled in the art. Typically the flavors are formulated by first adding citric acid, if present, to DI water at 70° F. The mixture is mixed for fifteen minutes. The solvent(s), ethyl alcohol and propylene glycol are added. The flavor is then added. The final mixture is mixed for about fifteen minutes.

Example 2A represents the flavoring composition concentrates according to the present invention, as well as a preferred percentages for each ingredient listed.

Example 2A

| Flavoring Composition Concentrates | | | | | | |
|---|---|---|---|---|---|---|
| | KIWI STRAWBERRY | PEACH | LEMON | BERRY | ORANGE | GRAPE |
| Propylene Glycol (%) | 4.55 | 4 | 0 | 13.9 | 15 | 0.1 |
| Ethyl Alcohol (%) | 4.16 | 4 | 12 | 3.1 | 15.8 | 7.1 |
| Potassium Citrate (%) | 3 | 2.7 | 4 | 3 | 2.6 | 3.5 |
| Citric Acid (%) | 17 | 9 | 14 | 17 | 11.7 | 16 |
| Flavor (%) | 0.9 | 0.3 | 3 | 2.8 | 1.6 | 4.1 |
| Sucalose (%) | 1 | 0.7 | 0.7 | 1 | 0.6 | 1 |
| Water (%) | 69.39 | 82 | 66.3 | 59.2 | 50.3 | 68.2 |
| TOTAL | 100 | 100 | 100 | 100 | 100 | 100 |

The above compositions of Example 2A are formulated by first heating DI water to about 75° F., plus or minus 5° F. The acids and intensive sweetener(s) are added simultaneously in a dry powdered form. The mixture is mixed for fifteen minutes. Temperature is maintained at 75° F., plus or minus 5° F. A liquid flavor is added. The mixture is mixed for five minutes. The mixture is heated to between about 185° F. and 215° F. The flavoring composition concentrate is packaged hot (above 180° F.) to maintain biological integrity. The packaged flavoring composition concentrate is then cooled to less than 100° F.

A standard batch of flavoring composition concentrate generates approximately 1000 pounds of liquid concentrate. In a preferred embodiment of the present invention, about 55 to about 80% of the flavoring composition concentrate is water; about 9 to about 20% of the flavoring composition concentrate is acid, and about 0.5 to about 1% of the flavoring composition concentrate is sweetener. The flavoring composition concentrate preferably has a viscosity of about 2.5 to about 5 centipoise.

It should be understood that the foregoing description is only illustrative of the present invention. Various alternatives and modifications can be devised by those skilled in the art without departing from the present invention. Accordingly, the present invention is intended to embrace all such alternatives, modifications and variances.

The invention claimed is:

1. A liquid beverage concentrate composition comprising:
   from about 1% to about 20% by weight of a flavor based on the weight of the liquid beverage concentrate composition;
   from about 12% to about 20% by weight of citric acid based on the weight of the liquid beverage concentrate composition;
   a salt system comprising one or more components selected from the group consisting of potassium citrate, sodium citrate, and any combination thereof;
   from about 20% to about 95% by weight of water solvent based on the weight of the liquid beverage concentrate composition; and
   a sweetener.

2. The liquid beverage concentrate composition according to claim 1, further comprising potassium citrate in an amount from about 0.2 wt. % to about 1.0 wt. % based on the weight of the liquid beverage concentrate composition.

3. The liquid beverage concentrate composition according to claim 1, further comprising potassium citrate in an amount from about 2 wt. % to about 5 wt. % based on the weight of the liquid beverage concentrate composition.

4. The liquid beverage concentrate composition according to claim 1, further comprising sodium citrate in an amount from about 0.4 wt. % to about 2.0 wt. % based on the weight of the liquid beverage concentrate composition.

5. The liquid beverage concentrate composition according to claim 1, wherein the density of the liquid concentrate composition is in a range of from about 1.05 grams per mL to about 1.15 grams per mL.

6. The liquid beverage concentrate composition according to claim 1, wherein the composition disperses in water in less than about 20 seconds.

7. A liquid beverage concentrate composition comprising:
   a flavor;
   from about 12% to about 20% by weight of citric acid based on the weight of the liquid beverage concentrate composition;
   one or more components selected from the group consisting of potassium citrate, sodium citrate, and any combination thereof;
   from about 20% to about 95% by weight of water solvent based on the weight of the liquid beverage concentrate composition; and
   a sweetener.

8. The liquid beverage concentrate composition according to claim 7, wherein the flavor comprises less than 2% by weight of the liquid beverage concentrate composition.

9. The liquid beverage concentrate composition according to claim 7, wherein the flavor comprises from about 1% to about 20% by weight based on the weight of the liquid beverage concentrate composition.

10. The liquid beverage concentrate composition according to claim 7, further comprising potassium citrate in an amount from about 0.2 wt. % to about 1.0 wt. % based on the weight of the liquid beverage concentrate composition.

11. The liquid beverage concentrate composition according to claim 7, further comprising potassium citrate in an amount from about 2 wt. % to about 5 wt. % based on the weight of the liquid beverage concentrate composition.

12. The liquid beverage concentrate composition according to claim 7, further comprising sodium citrate in an amount from about 0.4 wt. % to about 2.0 wt. % based on the weight of the liquid beverage concentrate composition.

13. The liquid beverage concentrate composition according to claim 7, wherein the density of the liquid concentrate composition is in a range of from about 1.05 grams per mL to about 1.15 grams per mL.

14. The liquid beverage concentrate composition according to claim 7, wherein the composition disperses in water in less than about 20 seconds.

15. A liquid beverage concentrate composition comprising:
   a flavor;
   citric acid and potassium citrate, wherein the combined amount of citric acid and potassium citrate is about 22% to about 25% based on the weight of the liquid beverage concentrate composition;
   from about 20% to about 95% by weight of water solvent based on the weight of the liquid beverage concentrate composition; and
   a sweetener.

16. The liquid beverage concentrate composition according to claim 15, wherein the flavor comprises less than 2% by weight of the liquid beverage concentrate composition.

17. The liquid beverage concentrate composition according to claim 15, wherein the flavor comprises from about 1% to about 20% by weight based on the weight of the liquid beverage concentrate composition.

18. The liquid beverage concentrate composition according to claim 15, wherein the density of the liquid concentrate composition is in a range of from about 1.05 grams per mL to about 1.15 grams per mL.

19. The liquid beverage concentrate composition according to claim 15, wherein the composition disperses in water in less than about 20 seconds.

\* \* \* \* \*